(12) United States Patent
Yang (10) Patent No.: US 7,963,795 B1
(45) Date of Patent: Jun. 21, 2011

(54) LIGHT GUIDING STRUCTURE FOR ELECTRIC CONNECTOR

(75) Inventor: Haven Yang, Taipei Hsien (TW)

(73) Assignee: All Best Precision Technology Co., Ltd., Taoyuan County ( * ) Notice: Subject to any disclaimer, the term of this patent is extended or adjusted under 35 U.S.C. 154(b) by 2 days.

(21) Appl. No.: 12/639,420

(22) Filed: Dec. 16, 2009

(51) Int. Cl.
*H01R 3/00* (2006.01)
(52) U.S. Cl. ........................................................ 439/490
(58) Field of Classification Search .................... 439/490
See application file for complete search history.

(56) References Cited

U.S. PATENT DOCUMENTS

2006/0003628 A1* 1/2006 Long et al. ................ 439/541.5
* cited by examiner

*Primary Examiner* — Ross N Gushi
(74) *Attorney, Agent, or Firm* — WPAT, P.C.; Anthony King (57) ABSTRACT

A light guiding structure for electric connector includes an insertion base being provided at two opposite lateral sides with a recessed portion each; at least two light-guiding units being separately connected to the two lateral sides of the insertion base, and respectively having an end formed into two engaging sections for fitting in the recessed portions; and an enclosure for enclosing the insertion base and the light-guiding units therein. The light guiding structure for electric connector can be easily and firmly assembled through engagement of the engaging sections of the light-guiding units with the recessed portions on the insertion base, and the light-guiding units are prevented from light leakage.

5 Claims, 12 Drawing Sheets

LIGHT GUIDING STRUCTURE FOR ELECTRIC CONNECTOR

FIELD OF THE INVENTION

The present invention relates to a light guiding structure for electric connector, and more particularly to a light guiding structure for electric connector that can be easily and firmly assembled and prevents the light-guiding units from light leakage.

BACKGROUND OF THE INVENTION

Figure 15:
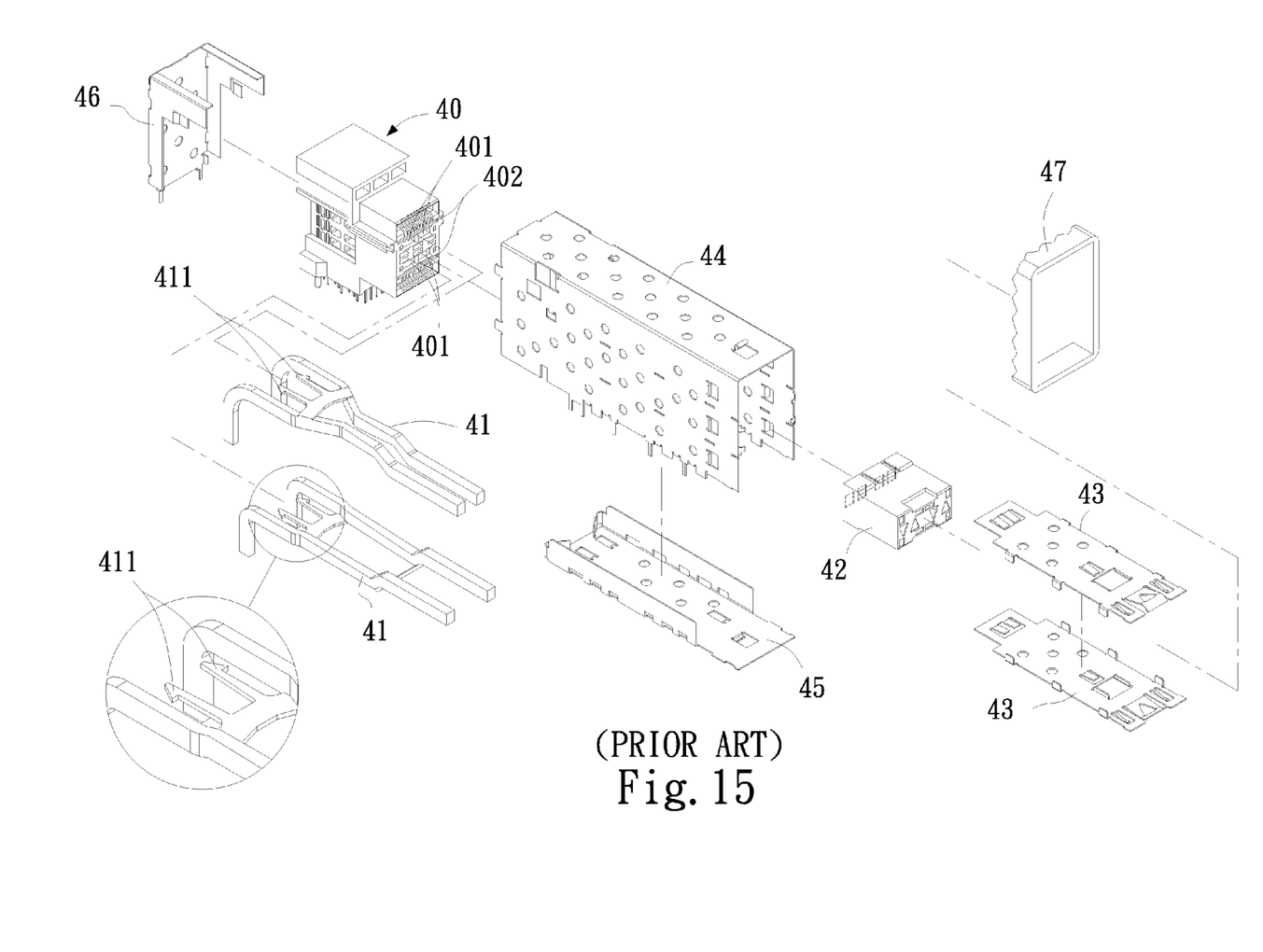
FIG. 15 is an exploded perspective view of a conventional light guiding structure for electric connector.

In a conventional light guiding structure for electric connector as shown in FIG. 15, there is included a base 40, two light guides 41, a fixing block 42, two clamping plates 43, a cover 44, a bottom plate 45, a back plate 46, and a fixing frame 47. To assemble the light guiding structure, first extend hooked portions 411 on one end of the two light guides 41 into through holes 401 provided on a front end surface of the base 40, so that the two light guides 41 are vertically spaced. Then, couple the fixing block 42 to another end of the two light guides 41 opposite to the hooked portions 411, and insert one end of the two clamping plates 43 into slots 402 provided on the front end surface of the base 40, so that the two clamping plates 43 are separately located above and below the assembled fixing block 42 and light guides 41. Thereafter, enclose a subassembly of the base 40, the light guides 41, the fixing block 42, and the clamping plates 43 in the cover 44. Finally, connect the bottom plate 45, the back plate 46, and the fixing frame 47 to the cover 44 to complete the light guiding structure for an electric connector.

Since the light guides 41 are associated with the base 40 simply through engagement of the hooked portions 411 of the light guides 41 with the through holes 401 on the front end surface of the base 40, the light guides 41 could not be firmly and stably connected to the base 40 and tend to sway relative to the base 40. Moreover, the light guides 41 associated with the base 40 are exposed from the base 40 without being shielded with any means. Thus, light guided by the light guides 41 tends to leak, preventing the light guides 41 from providing good brightness. And, to enclose the subassembly of the base 40, the light guides 41, the fixing block 42, and the clamping plates 43 in the cover 44, an operator has to hold the subassembly with one hand while using the other hand to slightly expand the cover 44. The subassembly has a relatively large overall length, and the light guides 41 are easily subject to sway and accordingly deflection under even a minor external force. That is, the subassembly of the base 40, the light guides 41, the fixing block 42, and the clamping plates 43 has an unstable structure, and it would be difficult for the operator to securely hold the subassembly with only one hand. As a result, it is uneasy to enclose the subassembly in the cover 44 to complete the assembling of the light guiding structure for the electric connector.

It is therefore tried by the inventor to develop an improved light guiding structure for electric connector, which can be easily and firmly assembled and no light leakage would occur at light-guiding units thereof.

SUMMARY OF THE INVENTION

A primary object of the present invention is to provide a light guiding structure for electric connector that can be easily and firmly assembled through engagement of light-guiding units with an insertion base;

Another object of the present invention is to provide and a light guiding structure for electric connector that prevents light-guiding units thereof from light leakage, so that the light-guiding units provide good brightness.

To achieve the above and other objects, the light guiding structure for electric connector according to the present invention includes an insertion base being provided at two opposite lateral sides with a recessed portion each; at least two light-guiding units being separately connected to the two lateral sides of the insertion base, and respectively having an end formed into two engaging sections for fitting in the recessed portions; and an enclosure for enclosing the insertion base and the light-guiding units therein.

The light guiding structure for electric connector according to the present invention can be easily and firmly assembled through engagement of the engaging sections of the light-guiding units with the recessed portions on the insertion base, and the light-guiding units are prevented from light leakage.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
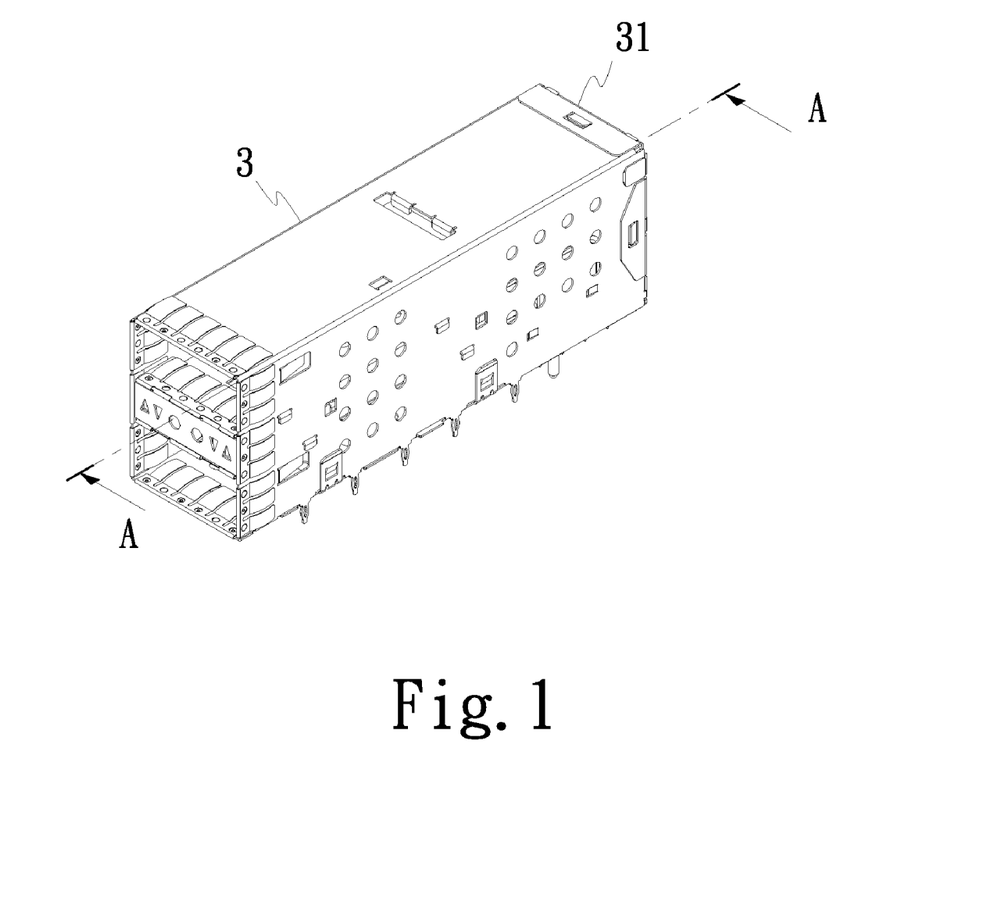
FIG. 1 is an assembled perspective view of a light guiding structure for electric connector according to a first embodiment of the present invention.
Figure 2:
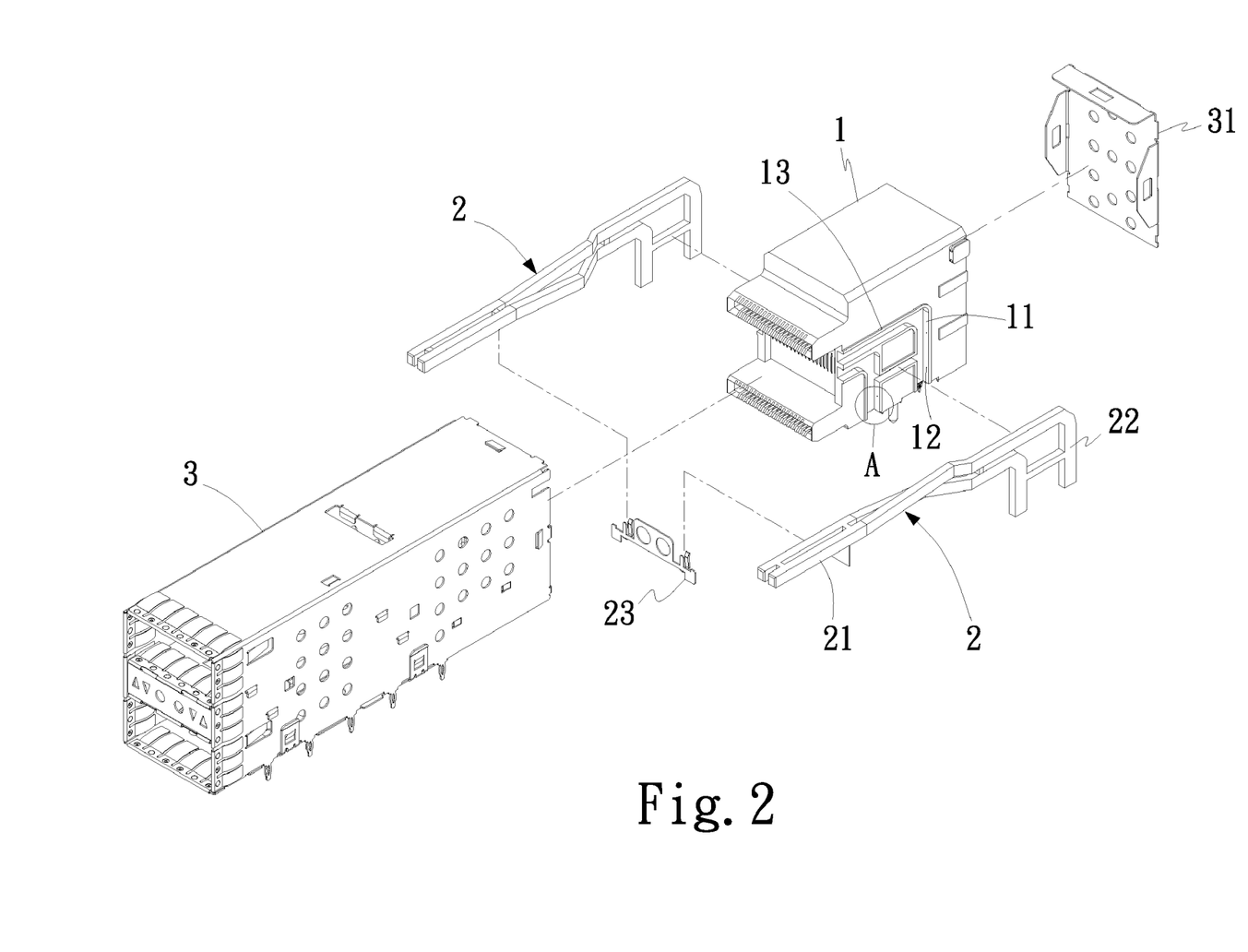
FIG. 2 is an exploded perspective view of FIG. 1.

Please refer to FIGS. 1 and 2 that are assembled and exploded perspective views, respectively, of a light guiding structure for electric connector according to a first embodiment of the present invention. As shown, the light guiding structure for electric connector in the first embodiment includes an insertion base 1, at least two light-guiding units 2, and an enclosure 3.

Figure 3:
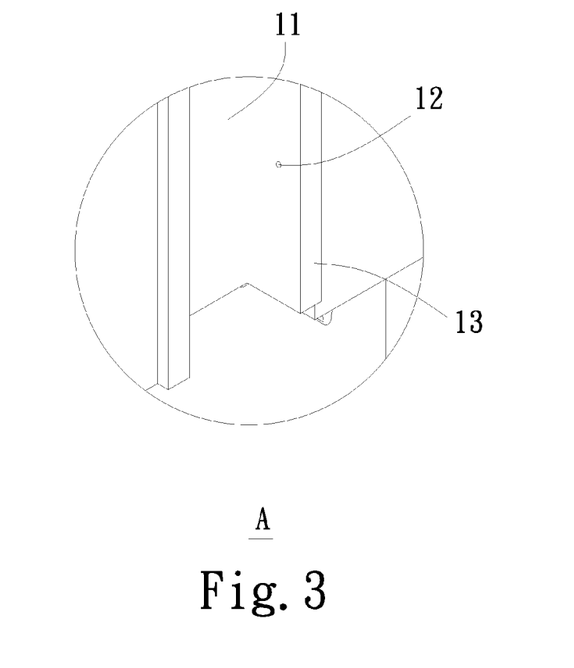
FIG. 3 is an enlarged view of the circled area A of FIG. 2.

The insertion base 1 is provided at two opposite lateral sides with a recessed portion 11 each. As can be more clearly seen from FIG. 3 that is an enlarged view of the circled area A of FIG. 2, the recessed portions 11 are provided on respective wall surface with a plurality of protrusions 12, and along every edge thereof with a flange 13 raised from outer surfaces of the two lateral sides of the insertion base 1.

The light-guiding units 2 are separately connected to the two lateral sides of the insertion base 1. Each of the light-guiding units 2 includes two corresponding light guides 21, and two engaging sections 22 opposite to the light guides 21 for engaging with the recessed portion 11 on one lateral side of the insertion base 1. The light guides 21 of the light-guiding units 2 are connected to and supported on a holding bracket 23.

The enclosure 3 encloses the insertion base 1 and the light-guiding units 2 therein.

Figure 4:
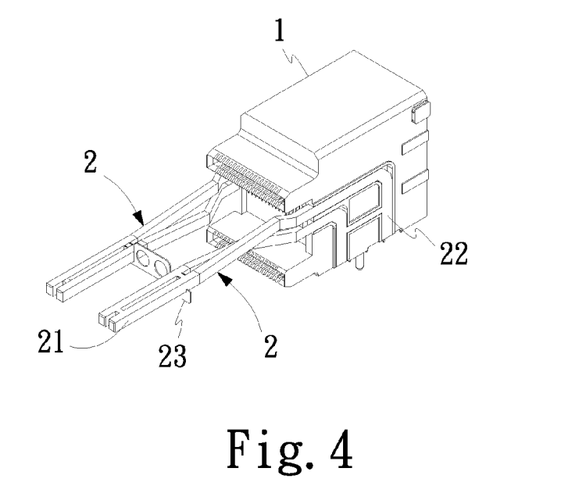
FIG. 4 is an assembled perspective view of a subassembly of an insertion base and two light-guiding units included in the first embodiment of the present invention.
Figure 5:
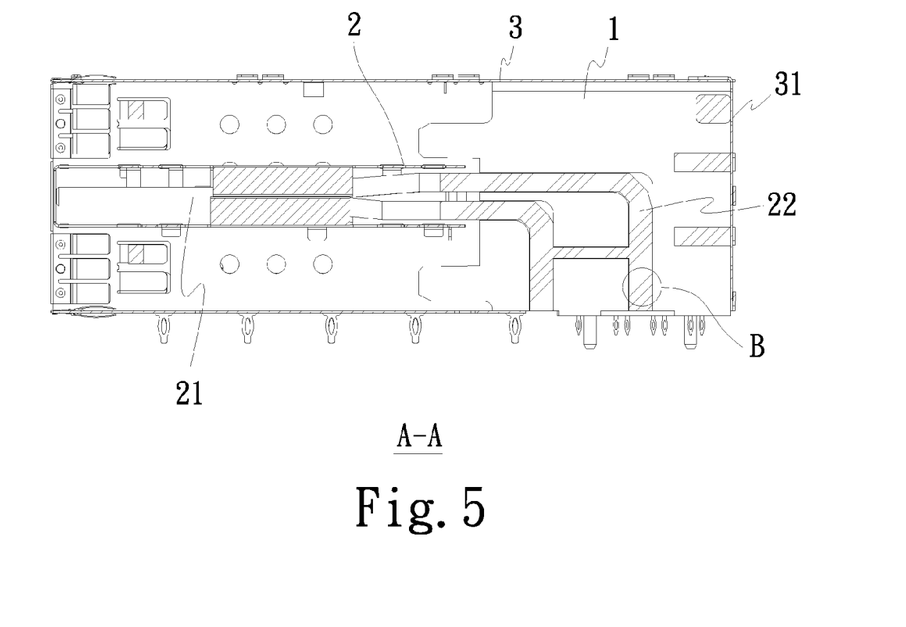
FIG. 5 is a sectional view taken along line A-A of FIG. 1.
Figure 6:
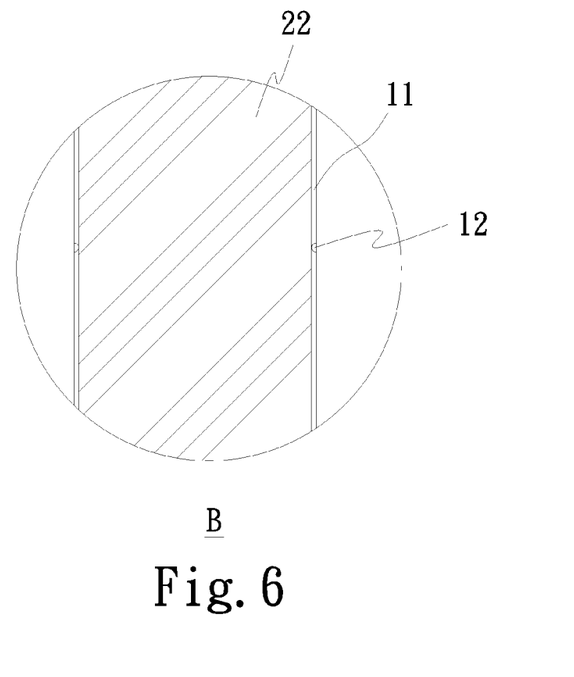
FIG. 6 is an enlarged view of the circled area B of FIG. 5.

To assemble the light guiding structure of the present invention, the engaging sections 22 of the light-guiding units 2 are directly fitted in the recessed portions 11 at the two lateral sides of the insertion base 1, such that the protrusions 12 on the wall surfaces of the recessed portions 11 are pressed against surfaces of the engaging sections 22 in contact with the wall surfaces of the recessed portions 11. Thereafter, the holding bracket 23 is connected to the light guides 21. Finally, a subassembly of the insertion base 1 and the light-guiding units 2 as shown in FIG. 4 is extended into and connected to the enclosure 3, and a rear cover 31 is connected to a rear end of the enclosure 3. Thus, the insertion base 1, the light-guiding units 2 and the enclosure 3 can be easily and firmly assembled to complete the light guiding structure for electric connector according to the present invention. Please refer to FIG. 5 that is a sectional view taken along line A-A of FIG. 1, and to FIG. 6 that is an enlarged view of the circled area B of FIG. 5. Since the engaging sections 22 of the light-guiding units 2 are fitly received in the recessed portions 11, light propagating along the light-guiding units 2 is protectively shielded by the recessed portions 11 to have relatively stable light path to avoid undesired light leakage. Therefore, the light guides 21 can emit relatively bright light.

Figure 7:
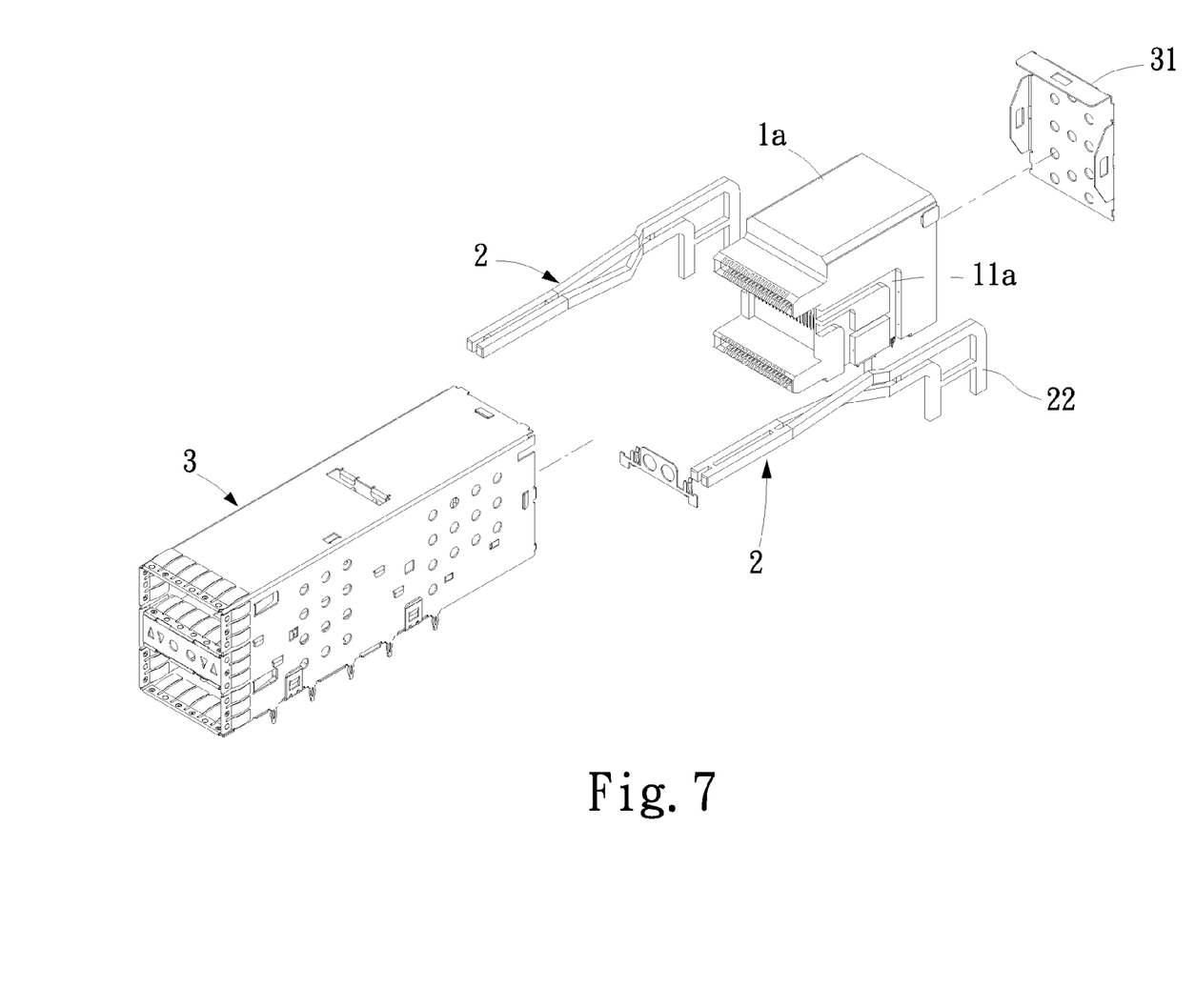
FIG. 7 is an exploded perspective view of a light guiding structure for electric connector according to a second embodiment of the present invention.
Figure 8:
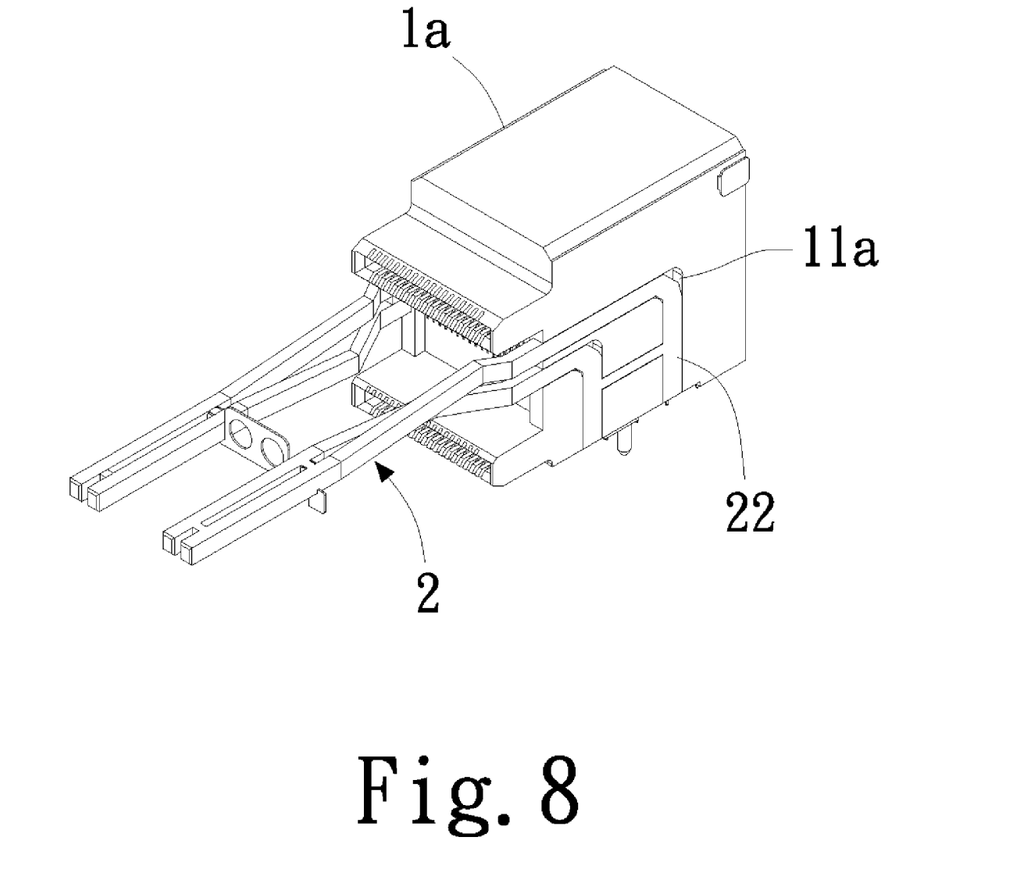
FIG. 8 is an assembled perspective view of a subassembly of an insertion base and two light-guiding units included in the second embodiment of the present invention.

Please refer to FIG. 7 that is an exploded perspective view of a light guiding structure for electric connector according to a second embodiment of the present invention, and to FIG. 8 that is an assembled perspective view of a subassembly of an insertion base 1a and two light-guiding units 2 included in the second embodiment of the present invention. As shown, the second embodiment is generally structurally similar to the first embodiment, except that two recessed portions 11a provided at two opposite lateral sides of the insertion base 1a have edges flush with outer surfaces of the two lateral sides of the insertion base 1a in response to a different manufacturing process. With these arrangements, the engaging sections 22 of the light-guiding units 2 can still be easily and firmly fitted in the recessed portions 11a to connect to the insertion base 1a, and the light-guiding units 2 are also prevented from light leakage.

Figure 9:
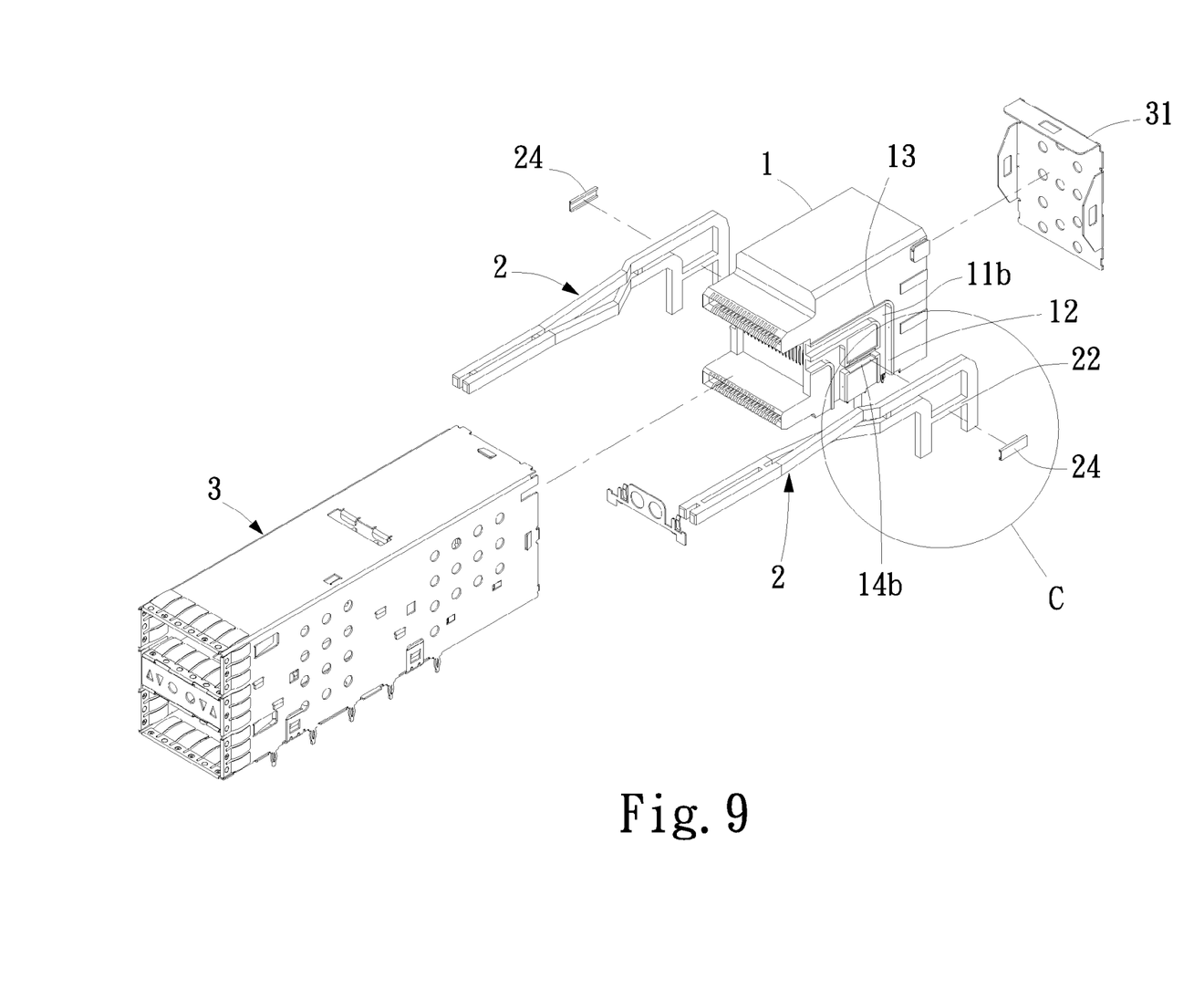
FIG. 9 is an exploded perspective view of a light guiding structure for electric connector according to a third embodiment of the present invention.
Figure 10:
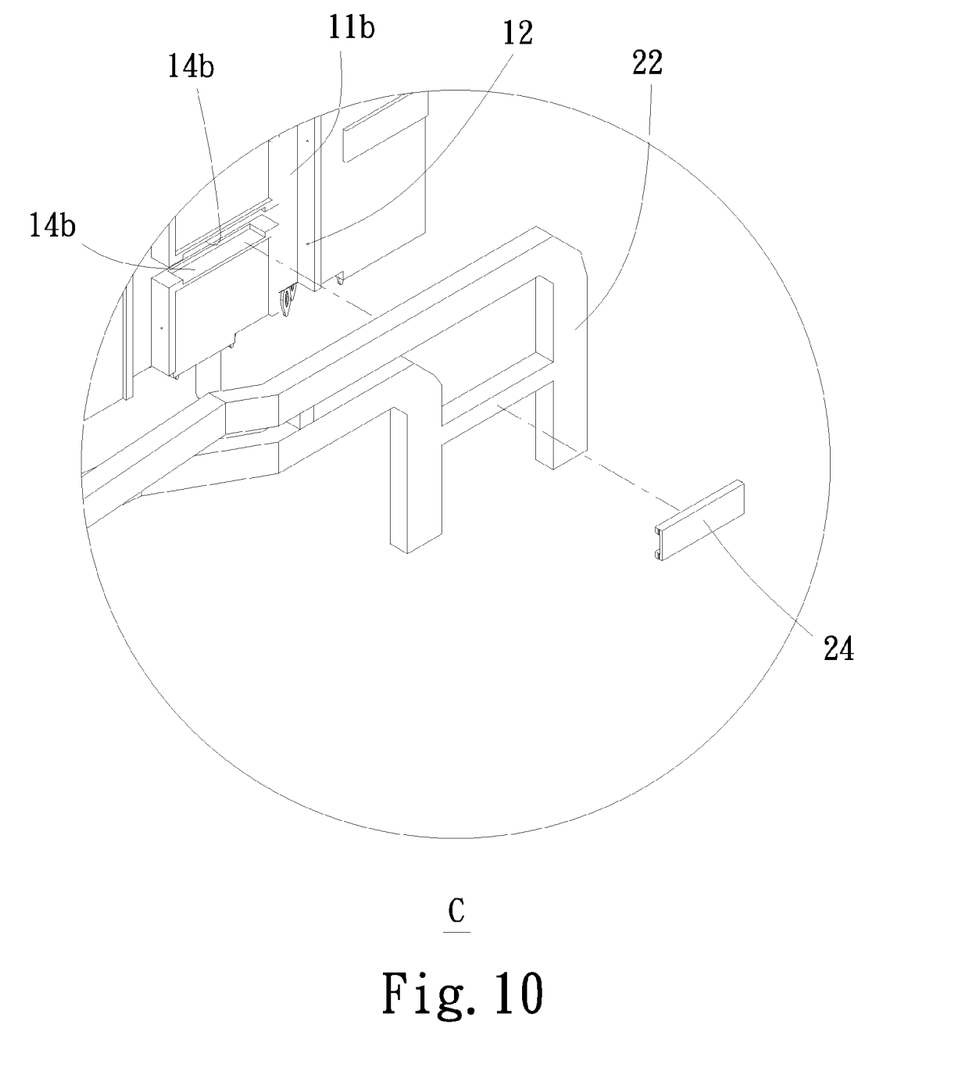
FIG. 10 is an enlarged view of the circled area C of FIG. 9.
Figure 11:
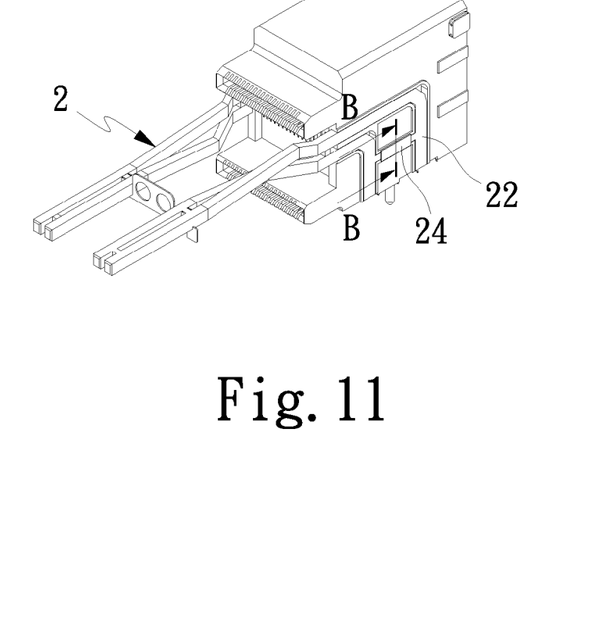
FIG. 11 is an assembled perspective view of a subassembly of an insertion base and two light-guiding units included in the third embodiment of the present invention.
Figure 12:
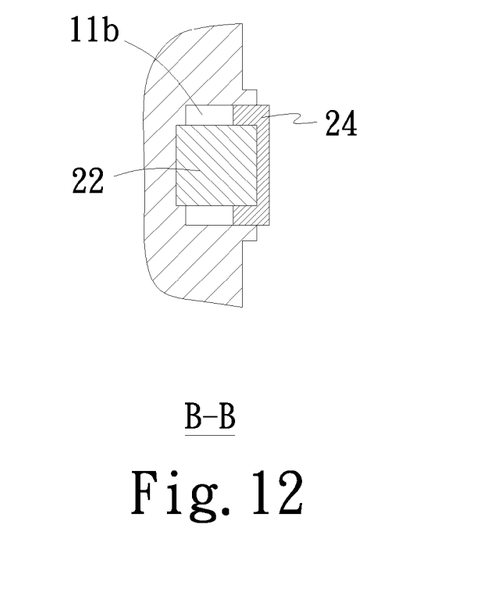
FIG. 12 is a sectional view taken along line B-B of FIG. 11.

FIG. 9 is an exploded perspective view of a light guiding structure for electric connector according to a third embodiment of the present invention; FIG. 10 is an enlarged view of the circled area C of FIG. 9; FIG. 11 is an assembled perspective view of a subassembly of an insertion base 1 and two light-guiding units 2 included in the third embodiment of the present invention; and FIG. 12 is a sectional view taken along line B-B of FIG. 11. Please refer to FIGS. 9 to 12. The third embodiment is generally structurally similar to the first and second embodiments, except for two recessed portions 11b and at least two retaining members 24. In the third embodiment, the engaging sections 22 of the light-guiding units 2 are fitly received in the recessed portions 11b provided on the two lateral sides of the insertion base 1. The two recessed portions 11b are correspondingly provided at predetermined positions with receiving recesses 14b (see FIG. 10) for receiving and holding the retaining members 24 therein, so that the engaging sections 22 of the light-guiding units 2 are more securely fitted in the recessed portions 11b. With these arrangements, the light guiding structure according to the third embodiment of the present invention can still be easily and firmly assembled and the light-guiding units 2 are prevented from light leakage.

Figure 13:
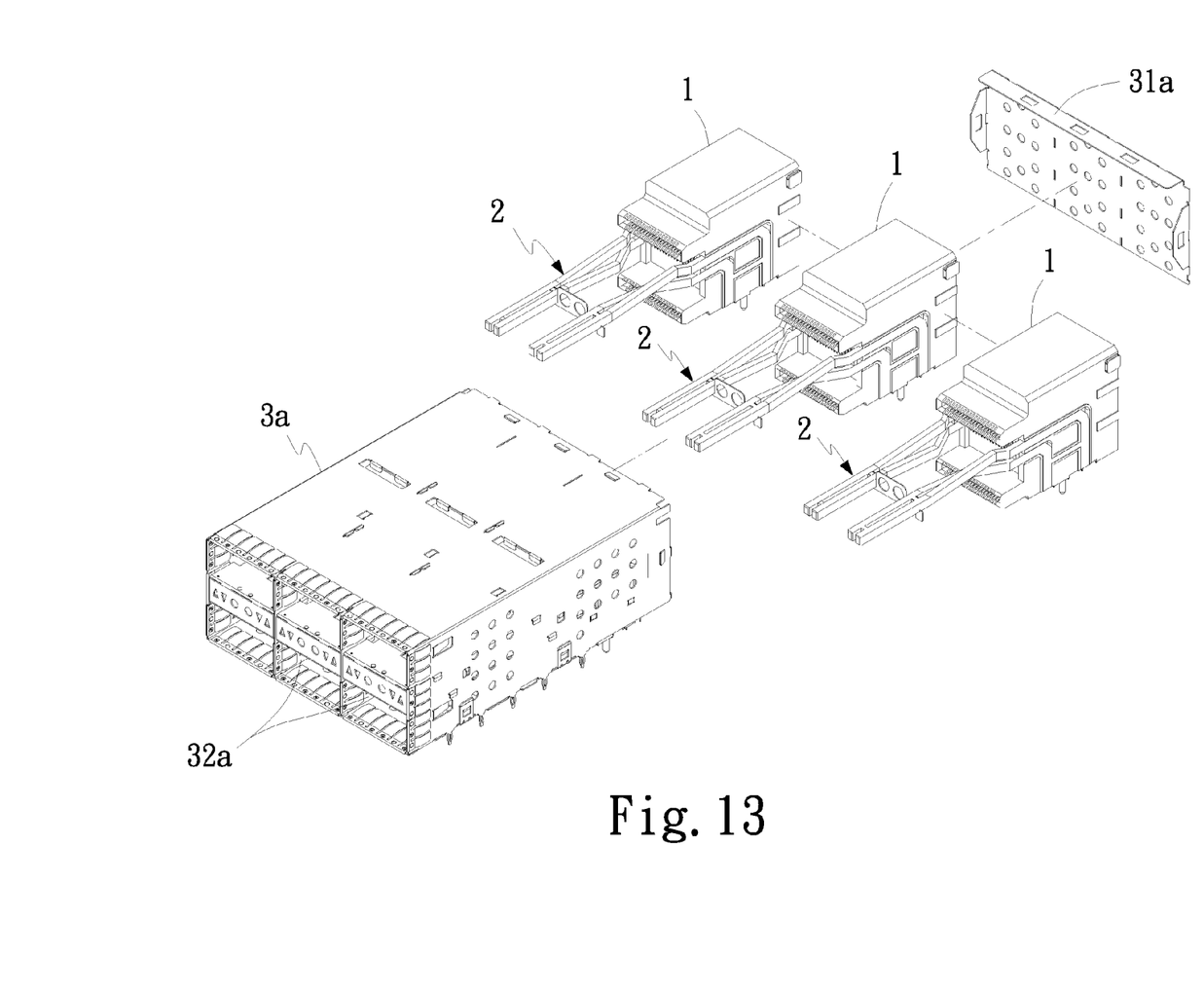
FIG. 13 is an exploded perspective view of a light guiding structure for electric connector according to a fourth embodiment of the present invention.
Figure 14:
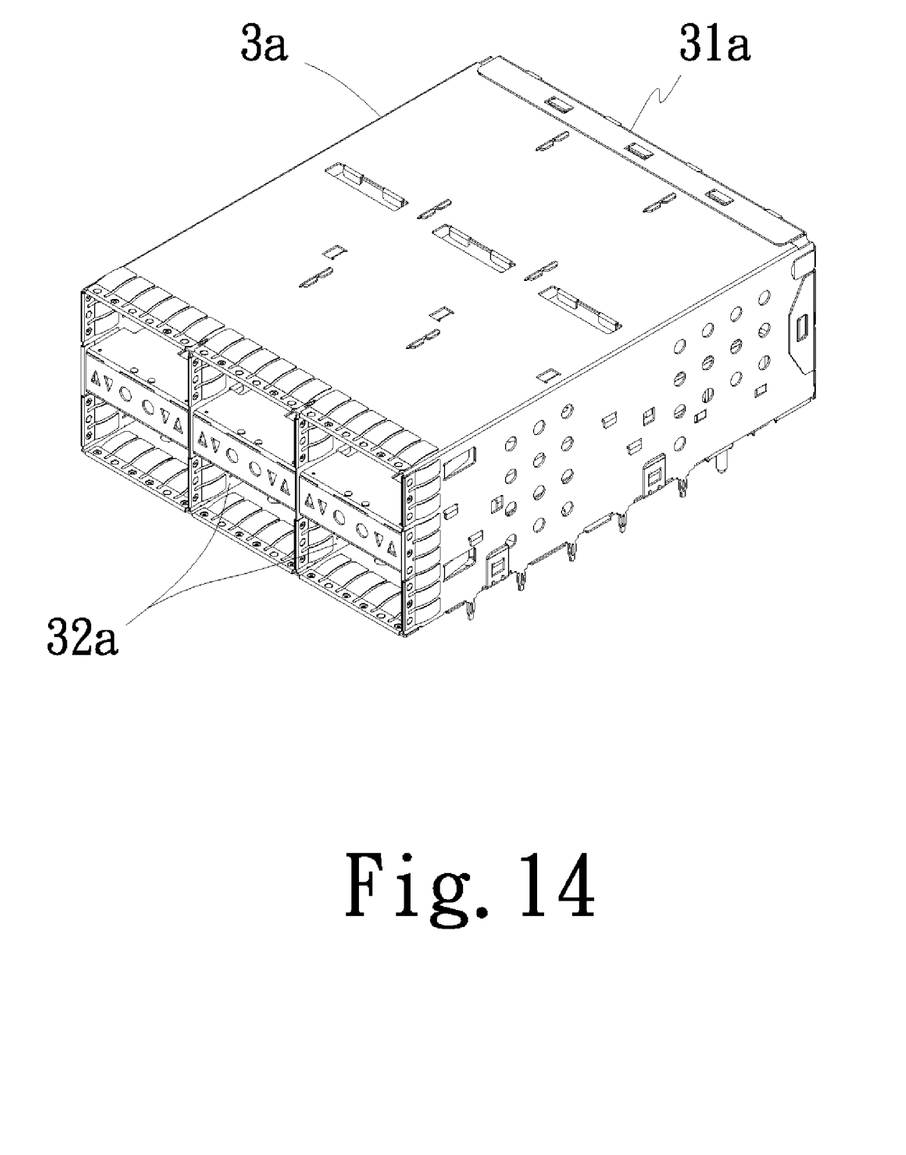
FIG. 14 an assembled perspective view of FIG. 13.

Please refer to FIGS. 13 and 14 that are exploded and assembled perspective views, respectively, of a light guiding structure for electric connector according to a fourth embodiment of the present invention. The fourth embodiment is generally structurally similar to the previous embodiments, except for a size-enlarged enclosure 3a and a correspondingly enlarged rear cover 31a to enclose a plurality of subassemblies of the insertion bases 1 and the light-guiding units 2 arranged side by side therein. The light-guiding units 2 are assembled to the two lateral sides of the insertion bases 1 in the manners as described in the previous embodiments. The enclosure 3a is internally provided with a plurality of partitions 32a to divide an internal space of the enclosure 3a into a plurality of sub-spaces, in each of which one subassembly of the insertion base 1 and the light-guiding units 2 is received. With the enlarged enclosure 3a, the present invention is more practical for use, and can still be easily and firmly assembled and prevents the light-guiding units 2 from light leakage.

In the present invention, the light-guiding units can be easily and firmly assembled to the insertion base by fitting the engaging sections of the light-guiding units in the recessed portions on the two lateral sides of the insertion base while the light-guiding units are prevented from light leakage. Therefore, the light guiding structure for electric connector according to the present invention is novel and improved, and is industrially practical for use because products derived from the present invention would no doubt meet the current market demands.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A light-guiding structure for electric connector, comprising:
    an insertion base being provided at two opposite lateral sides with a recessed portion each;
    at least two light-guiding units being separately connected to the two lateral sides of the insertion base, and one end of each of the light-guiding units being two engaging sections for fitting in the recessed portion; and
    an enclosure enclosing the insertion base and the light-guiding units therein, wherein the recessed portions are provided on respective wall surfaces with a plurality of protrusions for pressing against the engaging sections fitted in the recessed portions.

2. The light-guiding structure for electric connector as claimed in claim 1, wherein each of the recessed portions is provided along every edge thereof with a flange raised from outer surfaces of the two lateral sides of the insertion base.

3. The light-guiding structure for electric connector as claimed in claim 1, wherein the recessed portions have edges that are flush with outer surfaces of the two lateral sides of the insertion base.

4. The light-guiding structure for electric connector as claimed in claim 1, wherein each of the light-guiding units includes two corresponding light guides, and the engaging sections are located at one end of the light-guiding unit opposite to the light guides; and wherein the light guides of the light-guiding units are connected to and supported on a holding bracket.

5. The light-guiding structure for electric connector as claimed in claim 1, further comprising a plurality of retaining members, and the recessed portions being correspondingly provided at predetermined positions with receiving recesses for receiving and holding the retaining members therein, so that the engaging sections of the light-guiding units are fitly and securely retained in the recessed portions by the retaining members.

* * * * *